US009086749B2

(12) United States Patent
Pourbigharaz et al.

(10) Patent No.: US 9,086,749 B2
(45) Date of Patent: Jul. 21, 2015

(54) SYSTEM AND METHOD FOR IMPROVED PROCESSING OF TOUCH SENSOR DATA

(71) Applicant: QUALCOMM Incorporated, San Diego, CA (US)

(72) Inventors: Fariborz Pourbigharaz, San Diego, CA (US); Louis Dominic Oliveira, San Diego, CA (US); Raghukul Tilak, San Diego, CA (US); Suhail Jalil, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 82 days.

(21) Appl. No.: 14/015,614

(22) Filed: Aug. 30, 2013

(65) Prior Publication Data
US 2015/0062020 A1 Mar. 5, 2015

(51) Int. Cl.
*G06F 3/041* (2006.01)

(52) U.S. Cl.
CPC .............. *G06F 3/041* (2013.01); *G06F 3/0416* (2013.01)

(58) Field of Classification Search
CPC .... G06F 3/044; G06F 3/0416; G06F 3/04883
See application file for complete search history.

(56) References Cited

U.S. PATENT DOCUMENTS

| 2003/0063073 | A1 | 4/2003 | Geaghan et al. |
| 2005/0179645 | A1 | 8/2005 | Lin et al. |
| 2009/0115740 | A1 | 5/2009 | Ningrat et al. |
| 2010/0139991 | A1* | 6/2010 | Philipp et al. ............ 178/18.06 |
| 2011/0050618 | A1 | 3/2011 | Murphy et al. |
| 2012/0162100 | A1 | 6/2012 | Chang et al. |
| 2012/0162464 | A1 | 6/2012 | Kim |
| 2012/0166696 | A1 | 6/2012 | Kallio et al. |
| 2012/0169646 | A1 | 7/2012 | Berkes et al. |
| 2012/0249433 | A1 | 10/2012 | Deng et al. |
| 2012/0249476 | A1 | 10/2012 | Schwartz et al. |
| 2012/0300095 | A1* | 11/2012 | Sawada ..................... 348/222.1 |
| 2012/0319959 | A1 | 12/2012 | Saponas et al. |
| 2013/0076650 | A1 | 3/2013 | Vik et al. |
| 2013/0314365 | A1* | 11/2013 | Woolley et al. ............... 345/174 |

FOREIGN PATENT DOCUMENTS

| EP | 2042974 A2 | 4/2009 |
| EP | 2194453 A1 | 6/2010 |

OTHER PUBLICATIONS

International Search Report and Written Opinion—PCT/US2014/051873—ISA/EPO—Oct. 30, 2014.

\* cited by examiner

*Primary Examiner* — Maurice L McDowell, Jr.
(74) *Attorney, Agent, or Firm* — Knobbe Martens Olson & Bear LLP

(57) ABSTRACT

Implementations disclosed herein provide systems and methods for improved processing of touch sensor data with improved scalability and reduced standby power. Touch-related algorithms may be partitioned between the touch screen controller and the application processor or host such that the system can function with low standby power and low interface bandwidth while providing a scalable solution for enhanced user experience. In some aspects, a small digital processing engine and memory remains in the analog front end (AFE) of the touch screen controller to perform imagine forming algorithms that are mostly related to noise reduction and filtering schemes.

18 Claims, 4 Drawing Sheets

SYSTEM AND METHOD FOR IMPROVED PROCESSING OF TOUCH SENSOR DATA

TECHNICAL FIELD

The systems and methods disclosed herein relate generally to touch-sensing devices, and more particularly, to systems and methods that improve the processing of touch sensor data.

BACKGROUND

Advances in technology have resulted in smaller and more powerful computing devices. For example, there currently exist a variety of portable computing devices, including wireless computing devices such as wireless telephones, personal digital assistants (PDAs), and tablet computers that are small, lightweight, and easily carried by users. In order to simplify user interfaces and to avoid pushbuttons and complex menu systems, such portable computing devices may use touch screen displays that detect user gestures on the touch screen and translate the detected gestures into commands to be performed by the device. Such gestures may be performed using one or more fingers or a stylus type pointing implement. Multi-touch screens (touch screens having multi-touch capability) are designed to recognize and track several simultaneous touches. For example, when a user moves two fingers on a screen, information indicating touch/movement for both fingers is provided by a multi-touch screen.

One drawback of implementing multi-touch technology on portable computing devices is the processing overhead typically required for recognizing multi-touch gestures by a user. Processing overhead measures the total amount of work the central processing unit (CPU) of the device can perform and the percentage of that total capacity which is used by individual computing tasks, such as touch detection. In total, these tasks should require less than the CPU's overall capacity, or the processor becomes overloaded. Simple touch coordinates detection may typically be handled by a touch screen controller (TSC), which is a separate processor associated with the touch screen, but more complex touch gestures interpretation usually requires the use of a secondary processor running the operating system, often the mobile device's CPU. As the number of fingers or touch contacts increases, the processing overhead required for multi-touch detection and recognition may require a large percentage of the overall CPU capacity, impairing device performance.

The current generation of mobile computing devices is not well adapted to deal with increasing touch complexity and corresponding CPU overheads, especially in conjunction with the many other common high performance use cases. At the heart of most mobile devices is a baseband (BB) or an applications processor (AP) responsible for running an operating system and a variety of applications, as well as lower level software drivers. Increasing the size of the mobile processor core or cache delivers performance increases only up to a certain level beyond which heat dissipation issues make any further increase in core and cache size impractical. Overall processing capacity is further limited by the smaller size of many mobile devices, which limits the number of processors that can be included in the device. Additionally, because mobile computing devices are generally battery-powered, high performance use also shortens battery life.

Despite mobile processing limitations, many common mobile applications such as maps, games, email clients, web browsers, etc., are making increasingly complex use of touch recognition. Further, touch processing complexity increases proportional to touch-node capacity, which in turn increases proportional to display size. Capacitive touch screen displays are trending towards higher display sizes (10.1 to 17 inches). Additionally, multi-touch use cases involving up to 10 fingers and/or a pen or stylus also require higher responsiveness and improved performance from the touch screen device. Therefore, because there is a trend in many portable computing devices toward increasing display size and touch complexity, touch processing is increasingly reducing device performance and threatening battery life. Further, user interaction with a device through touch events is highly sensitive to latency, and user experience can suffer from low throughput interfaces between the touch screen panel and the host processor resulting in processing delay and response lag.

Current stand-alone touch screen controllers lack scalability in terms of digital processing and memory for supporting multi-touch use cases and algorithms. However, sending touch sensor raw data to the application processor or host for digital processing results in high standby power consumption and high interface bandwidth.

Conventional touch screen controllers incorporate an analog front end and a digital core. The analog front end performs sensing and acquisition of touch sensor data and sends this raw data to a digital core that performs noise reduction, image forming, touch validation and contact identification and tracking functions. This increases the memory and processing demand on the touch screen controllers. Existing solutions have moved many of the functions to the application processor or host while leaving the analog front end to perform relatively "dumb" functions such as sensing and acquisition of touch sensor data. This solution, however, requires a continuous flow of raw data to the host which increases standby power consumption. This solution also requires high interface bandwidth or pin counts due to the large amount of raw data continuously flowing from the analog front end to the application processor over the interface.

SUMMARY

Aspects of the disclosure relate to systems and methods for improved touch screen performance. Some aspects relate to partitioning the performance of touch-related algorithms between a touch screen controller and a separate application processor or host. This allows a touch-sensitive display system to use reduced standby power and have improved scalability to larger touch screen sizes. The partitioned performance may also provide enough processing power to support many different complex touch input use cases. In some aspects, the touch screen controller performs initial digital processing functions such as sensing and acquisition, as well as noise reduction and filtering processes, rather than relaying the entire raw data to the host processor for digital processing. This partitioning technique can improve standby power and reduce the interface bandwidth as compared to existing solutions. The systems and methods may be implemented in or performed by a mobile phone, a computer, or a digital imaging device.

In one aspect, the system sends filtered data to the application processor after performing initial digital processing functions within the touch screen controller. These initial digital processing functions may be related to noise reduction and filtering. In addition, in some aspects, the touch screen controller may prevent a continuous flow of raw data to the host during standby operation (i.e., periods of no touch input).

In another aspect, a system for improved processing of touch sensor data includes a touch panel, a touch detection module configured to capture touch data comprising at least a first touch event on the touch panel, a touch panel processing module configured to perform initial processing tasks on the touch event data and store filtered data, and an application processing module configured to perform additional processing tasks on the filtered data.

In yet another aspect, a method for improved processing of touch sensor data includes acquiring touch data from a touch panel, performing initial processing functions on the touch data using a first processor to produce filtered data, and performing secondary processing functions on the filtered data using a second processor.

In another aspect, a non-transitory computer-readable medium includes instructions that, when executed, cause a processor to perform a method. The method includes the steps of acquiring touch data from a touch panel, performing initial processing functions on the touch data using a first processor to produce filtered data, and performing secondary processing functions on the filtered data using a second processor.

In yet another aspect, an apparatus for improved processing of touch sensor data includes means for receiving touch data comprising at least a first touch event, means for performing noise reduction and imaging forming functions on the touch data to produce filtered data, and means for performing touch validation functions on the filtered data.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
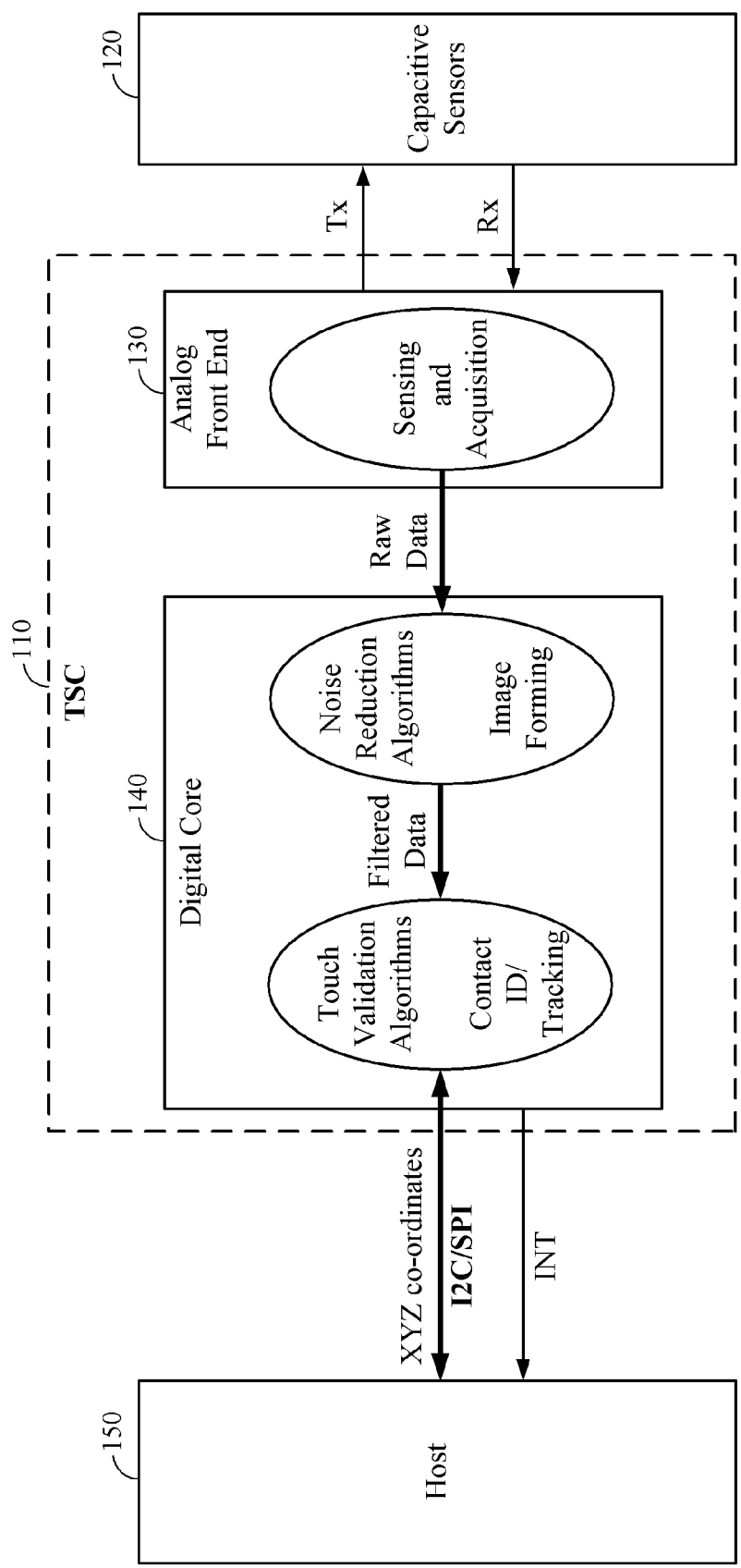
FIG. 1 illustrates a prior art touch screen controller and application processor system architecture for processing touch sensor data.

Implementations disclosed herein provide systems and methods for improved processing of touch sensor data with improved scalability and reduced standby power. As will be discussed in greater detail below, touch-related processes or instructions may be partitioned between a touch screen controller and an application processor or host such that the system functions with low standby power and low interface bandwidth while providing a scalable solution for enhanced user experience. In some aspects, a small digital processing engine and memory remains in the analog front end (AFE) of the touch screen controller to perform image forming processes that are mostly related to noise reduction and filtering schemes.

In addition, this "smart AFE" embodiment may employ delta processing techniques to prevent a continuous flow of data towards the application processor or host during standby, that is, at times of no touch being sensed by the touch sensor. Subsequent scanned data from the touch sensors may be compared to the previous scanned data to determine if there is a significant change between frames indicating a touch event. If the difference between two or more frames is negligible the flow of filtered data to the application processor would stop or be greatly reduced, allowing the host to enter a lower power mode such as standby or sleep. When a difference between subsequent frames is detected, the application processor may be brought back to an active state to perform additional processing functions on the filtered sensor data using the application processor's memory and processing resources.

Embodiments may be implemented in hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Overview

In general, touch algorithms may be categorized into "image forming" or "contact identification/tracking" algorithms. As shown in FIG. 1, conventional standalone touch screen controllers (TSCs) perform both sensing and acquisition of touch sensor data as well as processing functions using the raw data, including noise reduction and image forming. Additionally, the touch screen controller may further process the filtered data and perform additional touch validation processes and contact identification and tracking using onboard incorporated processing units. These configurations lack scalability in terms of digital processing and memory for supporting multi-touch use cases and algorithms, mainly due to cost and fabrication technology limitations.

A conventional standalone touch screen controller according to the prior art is shown in FIG. 1. In this illustration, the touch screen controller performs all or nearly all of the processing functions on the touch data. The touch screen controller (TSC) 110 receives sensor data from the capacitive sensors 120 usually incorporated in a touch panel of a touch-sensitive device. An analog front end (AFE) 130 of the touch screen controller senses and acquires the touch data from the capacitive sensors. This raw data is then sent to a digital processor 140 contained within the touch screen controller 110. The digital processor 140 performs filtering functions such as noise reduction and image forming on the raw data before performing additional processing functions on the filtered data, such as touch validation functions and contact identification and tracking. The processed data is then sent to the host or application processor 150 for additional processing. This configuration lacks scalability in terms of digital processing and memory, mainly due to cost and fabrication process limitations. The configuration shown in FIG. 1 demands an increasing amount of processing power and memory by the TSC in order to support multi-touch use cases.

The trend of capacitive touch screens towards increased display size and multi-touch use cases requires higher processing CPUs, more on-chip memory, and smaller geometries. However, a standalone TSC architecture such as that shown in FIG. 1 will have a higher cost and may be prohibitively complex to manufacture.

Figure 2:
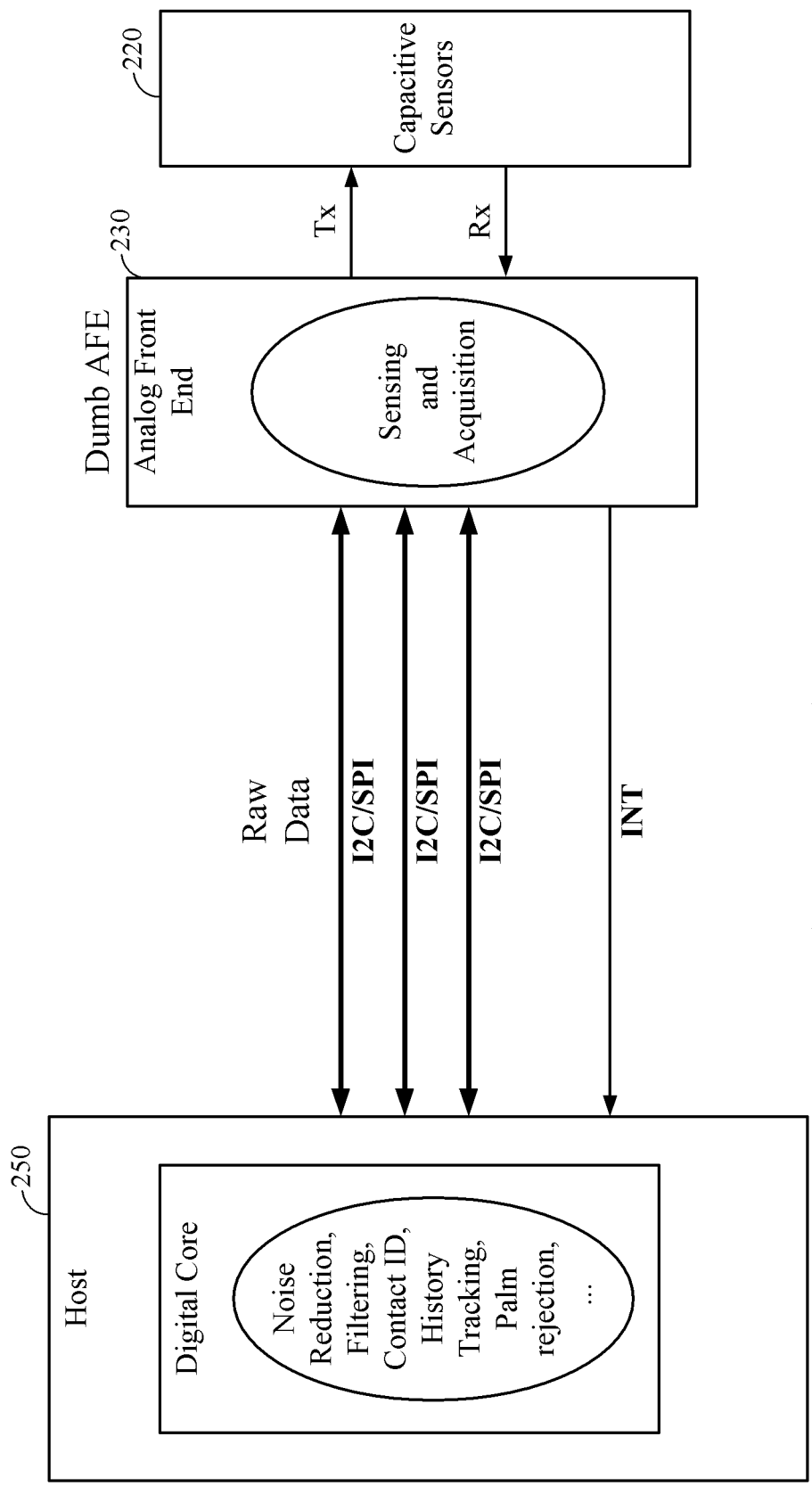
FIG. 2 illustrates a second prior art touch screen controller and application processor system architecture for processing touch sensor data.

One existing solution, shown in FIG. 2, was developed to address the challenges of the standalone TSC architecture. In this architecture, the analog front end of the touch screen controller is reduced to a "dumb" system that merely senses and acquires touch data from the capacitive sensors 220. The digital processing functions that were previously performed by the standalone touch screen controller shown in FIG. 1 are now performed by the application processor or host 250. Since the application processor has more processing and memory resources than the touch screen controller, this solution provides a scalable response to the increasing complexity of touch screen devices.

However, in this configuration, all of the raw data is continuously sent to the application processor. The application processor thus performs all or nearly all of the digital processing on the touch data, including noise reduction, filtering, contact identification, history tracking, palm rejection, and/or other digital algorithms for generating (X,Y) coordinates for every touched position. This configuration suffers from several issues, including high standby power due to the continuous flow of large amounts of raw data to the application processor resulting in potentially high consumption of interface power as well as dynamic power being consumed by the "always on" circuits within the host. Additionally, this solution also results in high interface bandwidth or pin counts or physical links between the touch screen controller and the application processor due to the large amounts of raw data that are transmitted to the application processor.

System Overview

Figure 3:
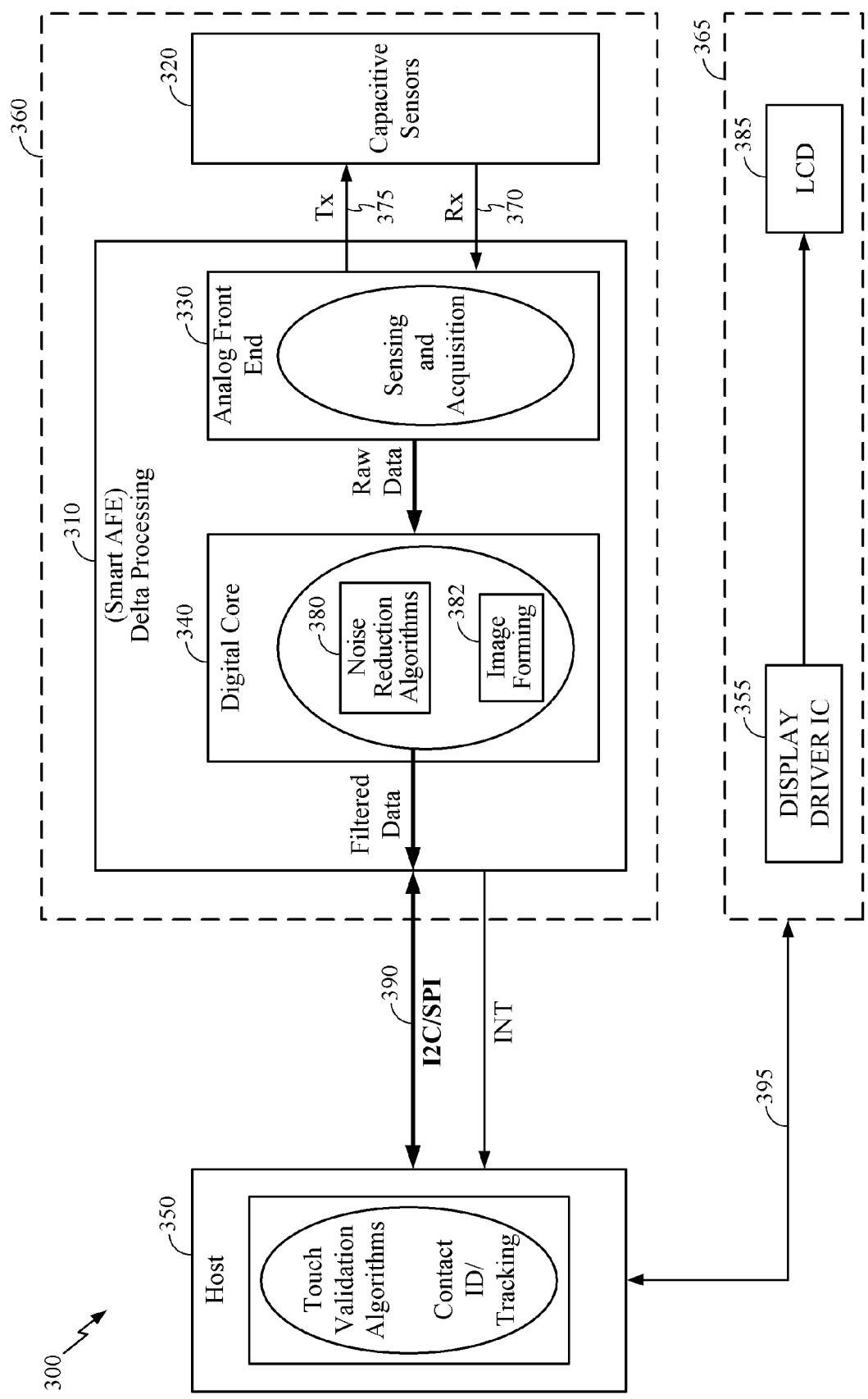
FIG. 3 illustrates a touch screen controller and application processor system architecture according to one embodiment of the present invention.

To address these issues, embodiments of the invention relate to an architecture such as that shown in FIG. 3. An electronic device 300 includes a display 365, a touchscreen panel 360, and an application processor 350. Certain embodiments of display component 365 may include any flat panel display technology, such as an LED, LCD, plasma, OLED or projection screen. As shown in FIG. 3, the display 365 includes a display driver integrated circuit (IC) 355 and an LCD panel 385. The display 365 is connected to the application processor via the interface 395. The touchscreen panel 360 is composed of a transparent panel 320 where the actual physical sensors reside, a touchscreen controller 310 (i.e. smart AFE) as well as a reception channel (Rx) 370 and a transmission channel (Tx) 375 interconnects. Display component 365 may be coupled to the host processor 350 for receiving information for visual display to a user via interface 395. Such information includes, but is not limited to, visual representations of files stored in a memory of device 300, software applications installed on device 300, user interfaces, and network-accessible content objects.

Touch screen panel 360 may employ one or a combination of many touch sensing technologies, for instance capacitive, resistive, surface acoustic wave, strain gauge, dispersive signal or optical touch sensing. The touch sensing technology may support multi-touch, stylus, hover and gestures. In some embodiments, touch screen panel 360 may overlay or be positioned over display 365 such that visibility of the LCD panel 385 is not impaired. In other embodiments, the touch screen panel 360 and display 365 may be integrated into a single panel or surface connected to host 350 over separate or the same interfaces. The touchscreen controller 310 (i.e. Smart AFE) may be configured to cooperate with display driver IC 355 such that a user touch on the touch sensor 320 is associated with a portion of the content displayed on LCD panel 385 corresponding to the location of the touch on touch sensor 320.

Touch screen panel 360 also contains a touch screen controller (TSC) 310. As shown in FIG. 3, the intelligent touch screen controller 310 has an analog front end (AFE) 330 that receives touch data along reception channel 370 and transmission channel 375 for driving rows (or columns) of capacitive sensors 320. Initial digital processing of this raw data, such as noise reduction and image forming, is performed by a digital core 340 within the TSC 310. This digital processing filters the sensor data so that only the data requiring additional processing is sent outside the touch screen controller 310. Thus, the digital core 340 includes processor instructions 380 for reducing noise, and also processor instructions 382 for forming images. This filtered data requiring additional processing is then transmitted along a bus 390 to an application processor 350 for additional processing. As one example, the bus between the touch screen processor 310 and the application processor 350 may be an I2C bus or an SPI bus.

By splitting the digital processing tasks between the digital core 340 of the intelligent touch screen controller 310 and the application processor 350, the application processor 350 and its interface may remain in low power modes when no touch event is registered, lowering the standby power requirements of the entire device. Additionally, fewer SPI channels along the SPI bus (i.e. a fewer number of pins) are needed since the amount of filtered data transmitted to the application processor is much less than the raw data transmitted to the application processor in configurations such as those described above.

In this configuration, the analog front end (AFE) is a "smart AFE" configured to perform some digital processing functions. A small digital processing engine and some memory are retained within the intelligent touch screen controller to perform image forming processing mostly related to noise reduction and filtering schemes. In addition, the intelligent touch screen controller can employ "delta processing" techniques to prevent the continuous flow of data towards the host processor during standby, as described in more detail below. Filtered data is then transmitted to the application processor for additional digital processing.

In some configurations, the host processor may include a co-processor that may be used to perform additional digital processing of the scanned touch data. In one configuration, the co-processor may perform finger identification and tracking functions while the host processor performs high-level operating system functions, such as running applications and managing device drivers.

The touch screen controller 310 acting as a smart AFE may be configurable. After filtering incoming raw data for reducing noise, the smart AFE can monitor the difference between consecutive filtered data frames over a particular period and if the difference does not exceed a set threshold, the smart AFE will stop further processing, assuming no touch events were present. This action implies completely turning off the flow of filtered data over an interface (e.g. SPI) while issuing an interrupt to the host or application processor to possibly transition its infrastructure to lower power states (e.g. idle mode). The data flow may restart again after the delta between two or more consecutive frames exceeds the set threshold (e.g. an active mode is entered). In the illustrated configuration, the MIPS and memory requirements in the smart AFE are optimized for performing noise reduction, delta processing and image forming for target resolution.

Method Overview

Figure 4:
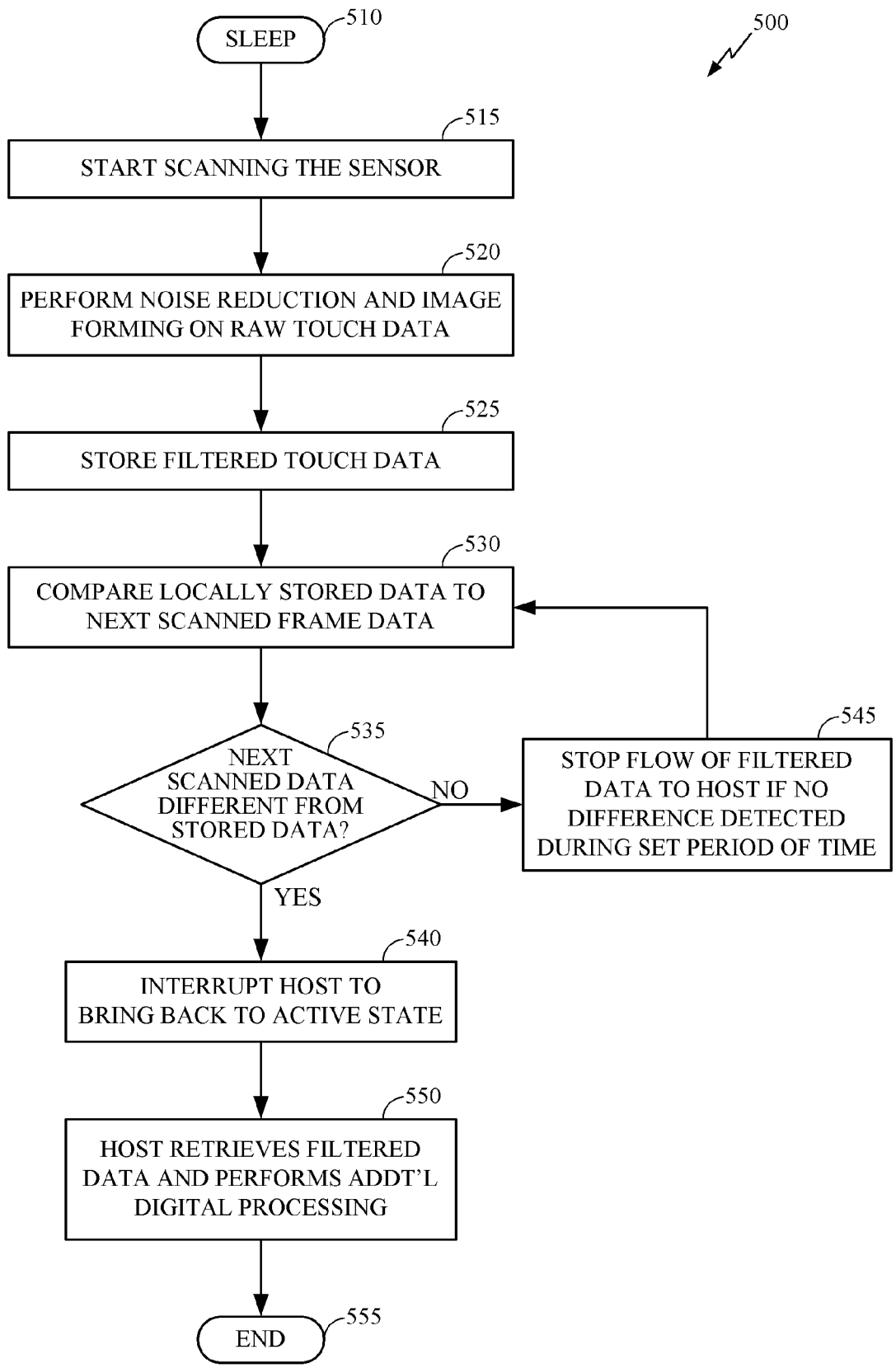
FIG. 4 is a flow chart depicting a high-level overview of a process to improve touch sensor data processing.

FIG. 4 illustrates one embodiment of a process 500 that may be used to improve touch sensor data processing. The illustrated process may be executed by the touch screen subsystem and host processor described above with respect to FIG. 3.

The process 500 begins at block 510 and transitions to block 515 to begin scanning the touch sensor when the user wakes the mobile device from an idle state by, for example, pressing the HOME button. The process then transitions to block 520, wherein image forming and noise reduction functions are performed on the scanned data. Interference from a variety of sources can cause degradation in sensed signal quality. Noise can be generated form one or more environmental sources like fluorescent lights, humidity, battery chargers, USB connectors or LCD panels. Filtering, averaging and thresholding are a few common techniques for removing background noise. Other techniques may also be employed when tackling particular noise sources.

Raw sensor data may be obtained one by one or one row at a time or in other fashions and orders. One set of scanned digital data represent a reversed gray scale image with darker areas representing higher pressure points, therefore higher pixel values. This is called raw image data which may be stored in memory or filtered on-the-fly for noise reduction to generate filtered data before storing the filtered data in memory. The scan rates usually vary between 50 Hz to 150 Hz but could be higher especially when oversampling. In effect, image forming implies capturing raw data from the sensor, converting to digital values, performing noise reduction and storing filtered data in memory. As described above, these filtering functions may be performed by a processing module located within the touch screen subsystem.

After performing noise reduction and image forming functions on the currently scanned touch data, process 500 transitions to block 525, wherein the data is stored in a local memory of the touch screen controller. Subsequent touch sensor data may be recognized, filtered, and stored. Process 500 then transitions to block 530, wherein the locally stored data is compared to the next scanned data to determine if there is a significant change between frames resembling a touch event. In block 535, a decision is made as to whether a significant difference exists between the stored data and the subsequent scanned data. If the difference between two or more frames of scanned data is negligible, process 500 transitions to block 545, wherein the flow of filtered data to the host processor is interrupted. The time period or number of frames to be compared before interrupting the flow to the application processor may be programmable. Additionally, or in lieu of stopping the flow of data, the touch screen subsystem may issue an interrupt indicating that the host processor and its corresponding infrastructures could potentially move to a lower power mode like standby or sleep. By moving to a lower power mode, standby power consumption could be reduced, which is a key consideration for mobile devices such as cell phones, tablets, and other mobile platforms. During the lower power mode of operation, the smart AFE could potentially operate with reduced touch sensor scan rates and/or reduced scan regions.

Once a significant difference resembling a touch event is detected, the process 500 transitions to block 540, wherein the host processor is sent an interrupt message, bringing it back to an active state. Once the host processor is back in an active state, process 500 transitions to block 550, wherein the host processor performs additional digital processing on the filtered touch data, such as contact qualification, identification and tracking algorithms. In some cases the host processor may disqualify the interrupt issued by the smart AFE indicating a potential touch event. Depending on the frequency or nature of the disqualifications the host processor may adjust smart AFE parameters like delta processing thresholds and/or noise reduction algorithm parameters in order to reduce the frequency of disqualifications. For example, the smart AFE may adjust these parameters when a charger is connected. Furthermore, scan rates and scan regions of the touch screen may be adjusted accordingly for an active mode of operation.

The filtered data received by the host processor has a much lower bandwidth compared to the raw data captured by the touch sensors. The smart AFE may employ lossless compression or partial frame transmission techniques to further reduce the bandwidth of the transmitted data based on target panel size, scan rates, bit per pixels, oversampling, or other techniques. Since frame data is already baselined, in some configurations the data could be normalized to achieve a high compression ratio. A given frame may only have a few areas of interest which constitute a fraction of the overall sensor area. In some configurations, communication protocol between the smart AFE and the host processor can employ addressing techniques to specifically address and transmit partial frame information.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for improved processing of touch sensor data, comprising:
    a touch panel;
    a touch detection module configured to capture touch data comprising at least a first touch event on the touch panel;
    a touch panel processing module configured to perform initial processing tasks on the touch event data and store filtered data, wherein the initial processing tasks comprise noise reduction functions and image forming functions; and
    an application processing module configured to perform additional processing tasks on the filtered data, wherein the additional processing tasks comprise touch validation functions.

2. The system of claim 1, wherein the system is implemented in a mobile phone, a computer, or a digital imaging device.

3. The system of claim 1, wherein the touch panel processing module comprises a touch screen subsystem having a touch screen controller.

4. The system of claim 1, wherein the touch panel comprises one of resistive, surface capacitive, projected capacitive, infrared, surface acoustic wave, strain gauge, optical imaging, or dispersive signal touch screen technologies.

5. The system of claim 1, wherein the application processing module comprises an application processor within a host.

6. The system of claim 1, wherein the additional processing tasks further comprise contact qualification, identification, and tracking functions.

7. A method for improved processing of touch sensor data, comprising:
    acquiring touch data from a touch panel;
    performing initial processing functions on the touch data using a first processor to produce filtered data, wherein performing initial processing functions comprises performing noise reduction functions and image forming functions; and
    performing secondary processing functions on the filtered data using a second processor, wherein performing secondary processing functions on the filtered data comprises performing touch validation functions.

8. The method of claim 7, wherein the first processor is a touch screen controller.

9. The method of claim 7, wherein the second processor is an application processor.

10. The method of claim 7, wherein performing secondary processing functions on the filtered data further comprises performing contact qualification, identification, and tracking functions.

11. The method of claim 7, wherein acquiring touch data from a touch panel comprises acquiring initial touch data and acquiring subsequent touch data.

12. The method of claim 11 further comprising comparing the subsequent touch data to the initial touch data to determine if a difference between the data exists and instructing the second processor to enter an inactive state and stopping the flow of data to the second processor if the difference is not above a threshold value.

13. A non-transitory computer-readable medium comprising instructions that, when executed, perform a method of:
    acquiring filtered data from a touch panel, wherein the filtered data was initially processed by
    a first processor to produce the filtered data, and wherein the initial processing comprises performing noise reduction functions and image forming functions; and
    performing secondary processing functions on the filtered data using a second processor, wherein the secondary processing functions comprise touch validation functions.

14. The computer-readable medium of claim 13, wherein the first processor is a touch screen controller.

15. The computer-readable medium of claim 13, wherein the second processor is an application processor.

16. The computer-readable medium of claim 13, wherein performing secondary processing functions on the filtered data further comprises performing contact identification and tracking functions.

17. An apparatus for improved processing of touch sensor data, comprising:
    means for receiving touch data comprising at least a first touch event;
    means for performing noise reduction and imaging forming functions on the touch data to produce filtered data wherein the means for performing noise reduction and image forming functions comprises a touch screen subsystem having a touch screen controller; and
    means for performing touch validation functions on the filtered data, wherein the means for performing touch validation functions comprises an application processor.

18. The apparatus of claim 17, wherein the means for receiving touch data comprises a touch panel.

* * * * *